United States Patent
Polzin et al.

(10) Patent No.: US 10,399,708 B1
(45) Date of Patent: Sep. 3, 2019

(54) ORIENTATION-INDEPENDENT APPARATUS FOR USE IN MATERIAL SUBLIMATION

(71) Applicant: United States of America as Represented by the Administrator of NASA, Washington, DC (US)

(72) Inventors: Kurt A. Polzin, Owens Cross Roads, AL (US); Joao F. Seixal, Huntsville, AL (US); Stephanie Mauro, Huntsville, AL (US); Jason Waggoner, Owens Cross Roads, AL (US); Robert Coker, Laurel, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 279 days.

(21) Appl. No.: 15/654,472

(22) Filed: Jul. 19, 2017

(51) Int. Cl.
   *B01D 5/00* (2006.01)
   *B63H 11/00* (2006.01)
   *B64G 1/24* (2006.01)
   *B64G 1/40* (2006.01)

(52) U.S. Cl.
   CPC .............. *B64G 1/24* (2013.01); *B64G 1/403* (2013.01)

(58) Field of Classification Search
   CPC ................................. B01D 5/00; B63H 11/00
   USPC ....... 60/202, 203.1, 204; 372/55–56, 58–60; 422/244
   See application file for complete search history.

(56) References Cited

U.S. PATENT DOCUMENTS

| | | | |
|---|---|---|---|
| 2,900,237 A | * | 8/1959 | Davidson ............... B01D 59/44 23/294 R |
| 6,609,363 B1 | | 8/2003 | Dressler et al. |
| 8,610,356 B2 | | 12/2013 | Szabo, Jr. et al. |
| 2005/0086926 A1 | | 4/2005 | King |

OTHER PUBLICATIONS

Kurt A. Polzin, Steven R. Peeples, Adam O. Burt, Adam K. Martin, Armando Martinez, Joao F. Seixal, and Stephanie Mauro; Development, Demonstration, and Analysis of an Integrated Iodine Hall Thruster Feed System; Conference paper presented at American Institute of Aeronautics and Astronautics conference in Salt Lake City, Utah, Jul. 25 to Jul. 27, 2016.

* cited by examiner

Primary Examiner — Monzer R Chorbaji
(74) Attorney, Agent, or Firm — James J. McGroary; Mark P. Dvorscak

(57) ABSTRACT

An apparatus for use in material sublimation includes a hollow reservoir having thermally conductive walls. A piston is disposed between the sealed end and the ported end of the reservoir, and is in sliding contact with the walls of the reservoir. The piston has holes passing there through. A force generator is coupled to the piston for applying a continuous force to the piston wherein the continuous force biases the piston towards the sealed end of the reservoir.

16 Claims, 2 Drawing Sheets

ORIENTATION-INDEPENDENT APPARATUS FOR USE IN MATERIAL SUBLIMATION

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to material sublimation. More specifically, the invention is an apparatus that supports sublimation of a solid material to a gaseous state thereof regardless of the orientation of the apparatus.

2. Description of the Related Art

In-orbit satellite propulsion can be provided by electric thrusters such as Hall-effect thrusters. Propellant for such Hall-effect thrusters can be gaseous iodine that is sublimated from a solid form of iodine. In a space environment, it is technically challenging to effectively store and efficiently sublimate the solid iodine onboard a vehicle operating in a minimal to no-gravity environment and whose orientation is ever changing.

SUMMARY OF THE INVENTION

Accordingly, it is an object of the present invention to provide an apparatus for use in material sublimation.

Another object of the present invention is to provide an apparatus for use in material sublimation that is unaffected by the orientation of the apparatus.

Still another object of the present invention is to provide an apparatus that simultaneously stores a solid material and provides for the material's sublimation in an efficient fashion.

Other objects and advantages of the present invention will become more obvious hereinafter in the specification and drawings.

In accordance with the present invention, an apparatus is provided for use in material sublimation. A hollow reservoir having thermally conductive walls has a sealed end and a ported end opposing the sealed end. A piston, disposed in the reservoir between the sealed end and the ported end thereof, is in sliding contact with the walls of the reservoir. The piston has holes passing there through. A force generator is coupled to the piston for applying a continuous force to the piston wherein the continuous force biases the piston towards the sealed end of the reservoir. A solid sublimable material fills a volume of the reservoir between the reservoir's sealed end and the piston.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
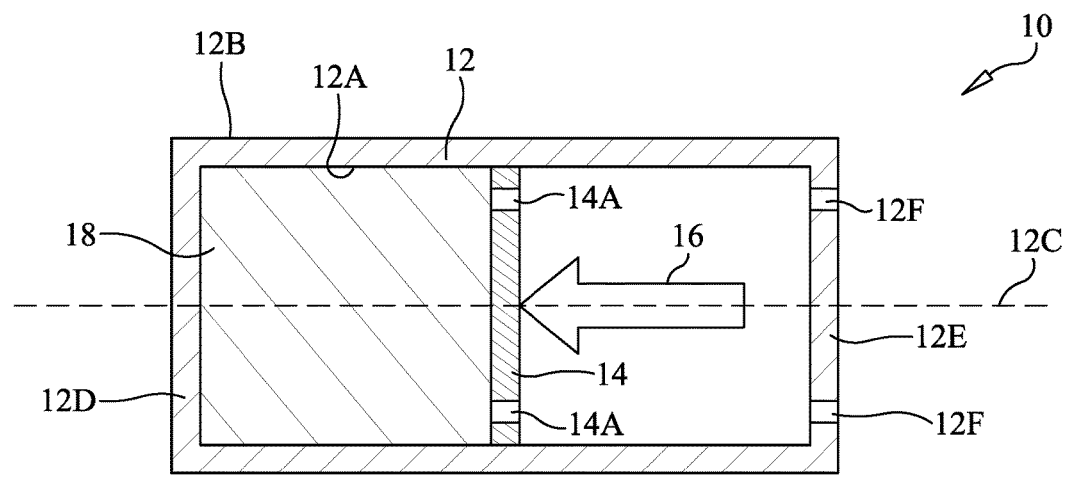
FIG. 1 is a cross-sectional schematic view of an apparatus for use in the storing and sublimation of a material in accordance with the present invention.

Referring now to the drawings and more particularly to FIG. 1, an apparatus for the storage and sublimation of a material in accordance with the present invention is shown and is referenced generally by numeral 10. By way of a non-limiting illustrative example, the present invention will be described for its use in the storage and sublimation of solid iodine that can then be used as a gaseous propellant. Since the required temperature and pressures required to sublimate solid iodine are well known in the art, discussions of same are omitted from the description of the present invention. Accordingly, it is a sufficient to say that reservoir 12 is heated in order to start and support the sublimation of solid material 18.

Apparatus 10 includes a reservoir 12, a piston 14 disposed in reservoir 12, and a force generator for applying a pressure force to piston 14 where such a force generator is represented by arrow 16. A solid material 18 capable of undergoing sublimation (e.g., solid iodine) is stored in reservoir 12. Solid material 18 can comprise a bulk material or pieces of the solid material (e.g., chunks, flakes, particles, etc.) without departing from the scope of the present invention.

Reservoir 12 is a hollow container having walls that will come into contact with solid material 18 with at least the contacting walls being made from thermally-conductive material(s). For example, when solid material 18 is iodine, the walls of reservoir 12 can be made from Hastelloy or Inconel, both of which are chemically resistant to reaction with iodine. The cross-sectional shape of reservoir 12 can be regular or irregular without departing from the scope of the present invention. By way of a non-limiting example, reservoir 12 can be cylindrical at least along its inner wall 12A. Outer wall 12B can mimic the shape of inner wall 12A or can be different without departing from the scope of the present invention. Inner wall 12A and/or outer wall 12B can be smooth or contoured for improved heat transfer without departing from the scope of the present invention.

In general, piston 14 is disposed within reservoir 12 such that it can engage with and slide along inner walls 12A of reservoir 12. Accordingly, it is assumed that reservoir 12 has a longitudinal axis 12C and that piston 14 is capable of sliding movement in reservoir 12 along axis 12C. One axial end 12D of reservoir 12 is sealed, and the opposing axial end 12E is ported where two ports 12F are indicated. More or fewer ports can be used without departing from the scope of the present invention. Ends 12D and 12E can be integral with reservoir 12 or attached thereto without departing from the scope of the present invention. Solid material 18 fills the volume of reservoir 12 between sealed end 12D and one face of piston 14. That is, solid material 18 abuts sealed end 12D and piston 14, and is in contact with inner walls 12A between sealed end 12D and piston 14.

Piston 14 is any disk or plug-like structure that can slidingly engage inner walls 12A of reservoir 12 such that solid material 18 cannot pass piston 14. Piston 14 also has a number of holes 14A that extend through piston 14. The size/diameter of holes 14A should be small enough to prevent the bulk passage of solid material 18. Holes 14A define a gaseous flow path through piston 14 for the vapor generated when solid material 18 undergoes sublimation. The number, size, and/or configuration of holes 14A is not a limitation of the present invention. Piston 14 can be made using the same thermally-conductive material used to fabricate reservoir 12. In this way, solid material 18 is completely encased in a thermally-conductive structure. The vapor generated through sublimation is extracted from reservoir 12 via ports 12F in ported end 12E. Vapor extraction techniques and apparatus are not limitations of the present invention.

Force generator 16 can be any element or arrangement of elements that applies a continuous force to piston 14 such that piston 14 is biased towards sealed end 12D thereby keeping piston 14 in its abutting relationship to solid material 18 throughout storage of solid material 18 and during the sublimation thereof. Typically, the force is applied to the central portion of piston 14 and along the longitudinal axis 12C of reservoir 12. The realization of force generator 16 can be accomplished in a variety of ways without departing from the scope of the present invention. Three such embodiments of force generator 16 are illustrated in FIGS. 2-4 and will be explained hereinbelow.

Figure 2:
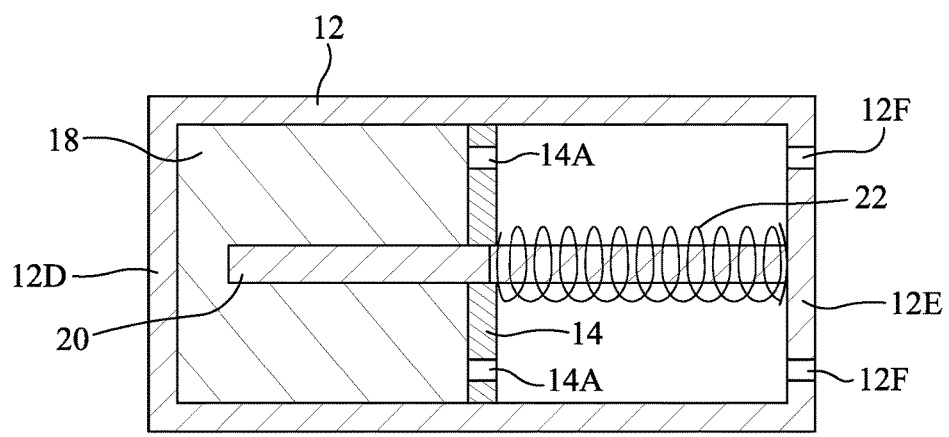
FIG. 2 is a cross-sectional view of a spring-based apparatus for use in the storing and sublimation of a material in accordance with an embodiment of the present invention.

Referring first to FIG. 2, a spring-based force generator includes a rod 20 serving as a guide for a spring 22. More specifically, rod 20 is fixed to (e.g., attached to, integrated with, etc.) ported end 12E, and passes through a central portion of piston 14 in a way that allows piston 14 to slide along rod 20. Spring 22 is disposed about rod 20, and is held in a state of compression as spring 22 bears against ported end 12E and piston 14. Rod 20 and spring 22 are sized and/or configured to support travel of piston 14 in reservoir 12 that allows for the complete sublimation of solid material 18 while maintaining piston 14 in an abutting relationship with any remaining portion of solid material 18. Accordingly, spring 22 is always in a state of compression during the sublimation of solid material 18.

Figure 3:
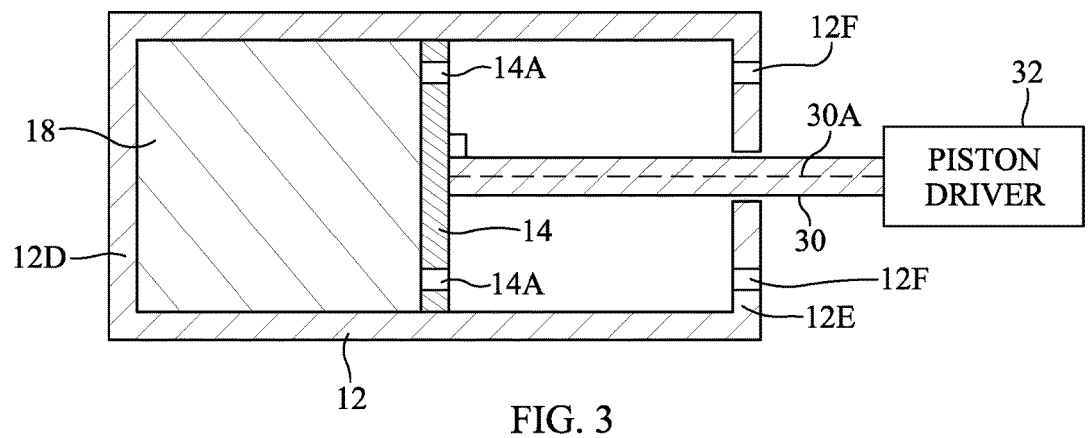
FIG. 3 is a cross-sectional view of a piston-driver-based apparatus for use in the storing and sublimation of a material in accordance with another embodiment of the present invention.

Referring next to FIG. 3, a piston-driver-based force generator includes a rigid rod 30 for translating force from a piston driver 32 to piston 14. More specifically, rigid rod 30 is fixed to (e.g., attached to, integrated with, etc.) piston 14 with the longitudinal axis 30A of rod 30 typically being perpendicular to piston 14 as illustrated. Rod 30 extends through ported end 12E such that rod 30 can move through ported end 12E. Typically, a seal (not shown) will be provided between rod 30 and a hole in ported end 12E through which rod 30 passes such that iodine gas extraction is limited to passage through ports 12F. Piston driver 32 is any conventional mechanized drive mechanism that can apply force to rod 30 (e.g., along its longitudinal axis 30A). Rod 30 translates the force to piston 14 where such force is used to keep piston 14 in an abutting relationship with solid material 18 before and throughout the sublimation process.

Figure 4:
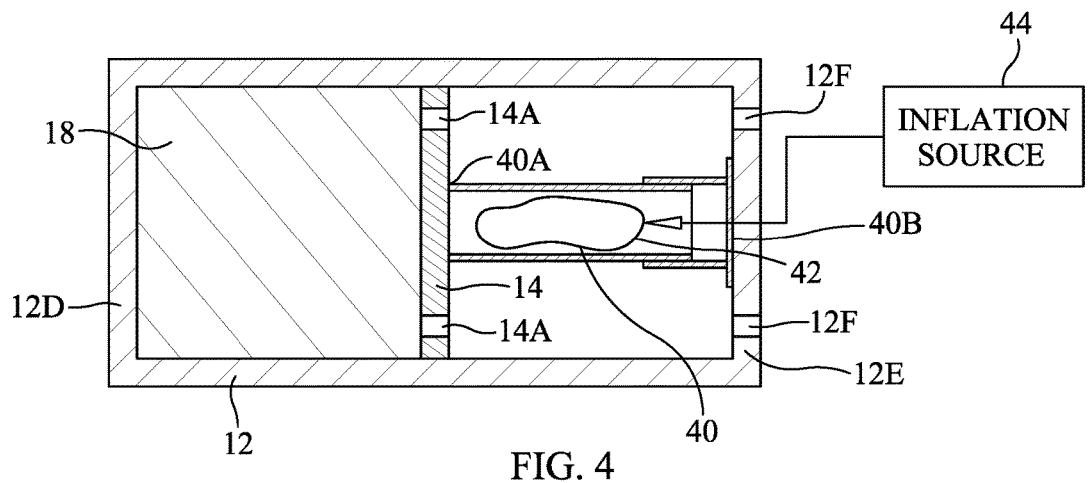
FIG. 4 is a cross-sectional view of an inflatable-bladder-based apparatus for use in the storing and sublimation of a material in accordance with yet another embodiment of the present invention.

FIG. 4 illustrates an inflatable-bladder-based force generator that includes a telescoping tube 40, an inflatable bladder 42, and an inflation source 44. More specifically, tube 40 is fixed to (e.g., attached to, integrated with, etc.) a central portion of piston 14. Tube 40 is open at end 40A thereof such that the interior portion of tube 40 is in fluid communication with piston 14. Tube 40 is closed at its opposing end 40B. For example, tube 40 can be fixed to ported end 12E such that ported end 12E serves to close end 40B. Disposed within tube 40 is inflatable bladder that can be inflated using inflation source 44. The fluid (not shown) used to inflate bladder 42 can be a liquid or gas without departing from the scope of the present invention. In use, bladder 42 is inflated until it applies pressure to piston 14 at open end 40A of tube 40. As solid material sublimates, bladder 42 is continually inflated to maintain sufficient force on piston 14 to thereby keep piston 14 in an abutting relationship with solid material 18 before and throughout the sublimation process. Tube 40 expands with the expansion of bladder 42.

The advantages of the present invention are numerous. By containing a solid material in a thermally-conductive reservoir while maintaining a continuous force on the solid material during its sublimation, the present invention assures good contact between the sublimating material and its reservoir throughout the entire sublimation process and without regard to orientation. Accordingly, the present invention will find great utility in microgravity environments.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An apparatus for use in material sublimation, comprising:
   a hollow reservoir having thermally conductive walls, said reservoir having a sealed end and a ported end opposing said sealed end;
   a piston disposed in said reservoir between said sealed end and said ported end, said piston being in sliding contact with said walls of said reservoir, said piston having holes passing there through; and
   a force generator coupled to said piston for applying a continuous force to said piston wherein said continuous force biases said piston towards said sealed end of said reservoir.

2. An apparatus as in claim 1, wherein said force generator comprises:
   a rod fixedly coupled to said ported end of said reservoir, said rod passing through a central portion of said piston and in sliding engagement with said piston; and
   a spring disposed about said rod and bearing against said ported end of said reservoir and said piston, wherein said spring is held in a state of compression.

3. An apparatus as in claim 1, wherein said force generator comprises:
   a rigid rod fixedly coupled to said piston, said rigid rod having a longitudinal axis perpendicular to said piston; and
   a driver coupled to said rigid rod for applying said continuous force along said longitudinal axis of said rigid rod wherein said continuous force is translated from said rigid rod to said piston.

4. An apparatus as in claim 1, wherein said force generator comprises:
   a hollow telescopic tube fixedly coupled to a central portion of said piston, said tube having an open end adjacent to said piston;

an inflatable bladder disposed in said tube; and an inflation source coupled to said bladder for inflating said bladder wherein said bladder expands within said tube and against said piston, wherein said bladder applies said continuous force to said piston.

5. An apparatus as in claim 1, further comprising a solid sublimable material disposed in said reservoir and filling a volume of said reservoir between said sealed end of said reservoir and said piston.

6. An apparatus as in claim 5, wherein said solid sublimable material comprises solid iodine.

7. An apparatus as in claim 1, wherein said reservoir comprises a cylindrical reservoir.

8. An apparatus for use in material sublimation, comprising:

a hollow reservoir having thermally conductive walls, said reservoir having a sealed end and a ported end opposing said sealed end;

a solid material disposed in said reservoir and filling a volume of said reservoir abutting said sealed end of said reservoir, said solid material subliming when said reservoir is heated;

a piston disposed in said reservoir and abutting said solid material, said piston being in sliding contact with said walls of said reservoir, said piston having holes passing there through; and a force generator coupled to said piston for applying a continuous force to said piston wherein said continuous force biases said piston against said solid material.

9. An apparatus as in claim 8, wherein said force generator comprises:

a rod fixedly coupled to said ported end of said reservoir, said rod passing through a central portion of said piston and in sliding engagement with said piston; and a spring disposed about said rod and bearing against said ported end of said reservoir and said piston, wherein said spring is held in a state of compression.

10. An apparatus as in claim 8, wherein said force generator comprises:

a rigid rod fixedly coupled to said piston, said rigid rod having a longitudinal axis perpendicular to said piston; and a driver coupled to said rigid rod for applying said continuous force along said longitudinal axis of said rigid rod wherein said continuous force is translated from said rigid rod to said piston.

11. An apparatus as in claim 8, wherein said force generator comprises:

a hollow telescopic tube fixedly coupled to a central portion of said piston, said tube having an open end adjacent to said piston and having a closed end opposing said open end;

an inflatable bladder disposed in said tube; and an inflation source coupled to said bladder for inflating said bladder wherein said bladder expands within said tube and against said piston, wherein said bladder applies said continuous force to said piston.

12. An apparatus as in claim 8, wherein said reservoir comprises a cylindrical reservoir.

13. An apparatus as in claim 8, wherein said solid material comprises solid iodine.

14. An apparatus for use in material sublimation, comprising:

a hollow cylindrical reservoir having thermally conductive walls, said reservoir having a sealed end and a ported end opposing said sealed end;

a piston disposed in said reservoir between said sealed end and said ported end, said piston being in sliding contact with said walls of said reservoir, said piston having holes passing there through;

a rod fixedly coupled to said ported end of said reservoir, said rod passing through a central portion of said piston and in sliding engagement with said piston; and a spring disposed about said rod and bearing against said ported end of said reservoir and said piston, wherein said spring is held in a state of compression.

15. An apparatus as in claim 14, further comprising a solid material disposed in said reservoir and filling a volume of said reservoir between said sealed end of said reservoir and said piston, said solid material subliming when said reservoir is heated.

16. An apparatus as in claim 15, wherein said solid material comprises solid iodine.

* * * * *